(12) United States Patent
Hon

(10) Patent No.: US 9,889,625 B2
(45) Date of Patent: Feb. 13, 2018

(54) COMPOSITE OF METAL AND RESIN

(71) Applicant: HON HAI PRECISION INDUSTRY CO., LTD., New Taipei (TW)

(72) Inventor: Kar-Wai Hon, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/373,875

(22) Filed: Dec. 9, 2016

(65) Prior Publication Data

US 2017/0087800 A1 Mar. 30, 2017

Related U.S. Application Data

(62) Division of application No. 14/515,935, filed on Oct. 16, 2014, now Pat. No. 9,573,345.

(30) Foreign Application Priority Data

Oct. 24, 2013 (CN) .......................... 2013 1 0503354

(51) Int. Cl.
*B32B 3/26* (2006.01)
*B29C 45/14* (2006.01)
*B32B 15/08* (2006.01)
*B29K 705/00* (2006.01)
*B29L 31/34* (2006.01)

(52) U.S. Cl.
CPC ........ *B32B 3/263* (2013.01); *B29C 45/14311* (2013.01); *B29C 45/14795* (2013.01); *B32B 15/08* (2013.01); *B29K 2705/00* (2013.01); *B29K 2881/04* (2013.01); *B29K 2995/0041* (2013.01); *B29L 2031/34* (2013.01); *B32B 2250/02* (2013.01); *B32B 2307/704* (2013.01); *B32B 2457/00* (2013.01)

(58) Field of Classification Search
None
See application file for complete search history.

(56) References Cited

U.S. PATENT DOCUMENTS

| 5,811,019 A | * | 9/1998 | Nakayama | ............... B41J 2/162 |
| | | | | 216/27 |
| 2002/0172799 A1 | * | 11/2002 | Subramanian | ......... A47C 7/742 |
| | | | | 428/105 |
| 2008/0078522 A1 | * | 4/2008 | Kim | ...................... B22D 17/24 |
| | | | | 164/302 |

(Continued)

FOREIGN PATENT DOCUMENTS

| CN | 102442028 A | * | 5/2012 |
| JP | 2009051131 A | * | 3/2009 |

*Primary Examiner* — Shamim Ahmed
(74) *Attorney, Agent, or Firm* — ScienBiziP, P.C.

(57) ABSTRACT

A composite of metal and resin and a manufacturing method require a metal piece and a resin piece, and the surface of the metal piece is etched to include a number of micropores. Each micropore includes a first inclined hole and a second inclined hole, the first inclined hole and the second inclined hole diverging from each other below the surface of the metal piece. The first inclined hole and the second inclined hole extend downwards from a common starting hole which is symmetric around an axis perpendicular to the surface of the metal piece. The resin is embedded in the micropores to combine with the metal piece, where the bonding strength of the composite of metal and resin is increased.

10 Claims, 6 Drawing Sheets

(56) References Cited

U.S. PATENT DOCUMENTS

2011/0011827 A1* 1/2011 Lee .................. A61M 37/0015
                                                   216/11
2012/0207982 A1* 8/2012 Aso .................... B29C 45/0005
                                                  428/164

* cited by examiner

COMPOSITE OF METAL AND RESIN

CROSS-REFERENCE TO RELATED APPLICATION

The present application is a divisional application of U.S. patent application Ser. No. 14/515,935, filed on Oct. 16, 2014, U.S. Pat. No. 9,573,345 which claims priority to Chinese Application No. 201310503354.3 filed on Oct. 24, 2013, the contents of which are entirely incorporated by reference herein.

FIELD

This disclosure generally relates to a composite of metal and resin suitable for casings of electronic devices, housings of home electric appliances, structural components, machinery parts, for example, and also to a method for manufacturing the composite.

BACKGROUND

Composites of metal and resin are used in a variety of industrial fields. For example, a metal layer and a resin layer can be joined together by an adhesive material. Recently, a new method of injection joining for manufacturing composites of metal and resin has be introduced. In this method, a molten resin material is injected onto a metal piece that has been previously inserted into an injection molding mold. The surface of the metal combines with the resin. Before inserting the metal piece into the mold, a surface of the metal piece is treated by an etchant to form a number of micropores so that a stronger bond may be formed with the resin material.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
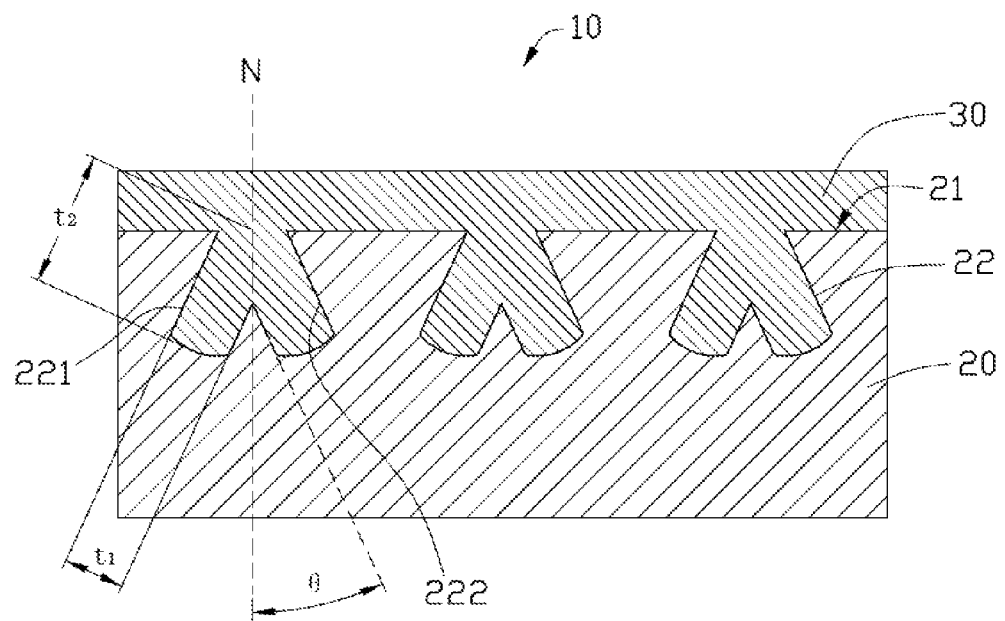
FIG. 1 is a cross-sectional view of a composite of metal and resin, in accordance with an exemplary embodiment.

This disclosure is illustrated by way of example and not by way of limitation in the figures of the accompanying drawings in which like reference numerals indicate similar elements. It should be noted that references to "an" or "one" embodiment in this disclosure are not necessarily to the same embodiment, and such references mean "at least one".

FIG. 1 illustrates a composite 10 of metal and resin. The composite 10 can include a metal piece 20 and a resin piece 30.

The metal piece 20 can include a surface 21 defining a plurality of micropores 22. At least one of the micropores 22 can be in the shape of an inverted "V". Each micropore 22 can include a first inclined hole 221 and a second inclined hole 222 which are both inclined with respect to the surface 21 of the metal piece 20. The first inclined hole 221 and the second inclined hole 222 can be symmetrical around line N shown in FIG. 1. The line N represents an axis (N-axis) substantially perpendicular to the surface 21 of the metal piece 20. The first inclined hole 221 and the second inclined hole 222 extend downwards in a diverging manner into the metal piece 20 from a common starting hole (not explicitly labeled) on the surface 21 of the metal piece 20. The first inclined hole 221 and the second inclined hole 222 can be communicated with each other and share a common opening on the surface 21. The material of the metal piece 20 can be selected from a group consisting of aluminum alloy, magnesium alloy, stainless steel alloy, copper, and copper alloy.

In the illustrated embodiment, the first inclined hole 221 and the second inclined hole 222 can be each sloped at an angle $\theta$ in relation to the N-axis, and the angle $\theta$ can be in a range from about 15 degrees to about 45 degrees. The micropores 22 can be positioned in an array. In other exemplary embodiments, the micropores 22 can be positioned randomly.

The first inclined hole 221 and the second inclined hole 222 each have a diameter defined as t1, and a depth defined as t2. In one exemplary embodiment, t1 can be in a range from about 100 nanometers (nm) to about 300 nm, and a width-to-depth ratio (t1/t2) can be in a range from about 1:3 to about 1:5.

The resin piece 30 becomes bonded to the metal piece 20 when molten resin material is inserted into a mold holding the metal piece 20, wherein the molten resin material is embedded into the micropores 22. The resin material is a thermoplastic resin which crystallizes as it cools. The crystallized-type thermoplastic resin material can be selected from the group consisting of a composite of polyphenylene sulfide and glass fiber, polyamide, polyethylene terephthalate, and polybutylene terephthalate. When using the polyphenylene sulfide and glass fiber composite, the percentage composition of the glass fiber is in a range from 20 percent to 50 percent.

Each micropore 22 can include the first inclined hole 221 and the second inclined hole 222. When an external force is applied to separate the metal piece 20 and the resin piece 30, the external force is divided into a first force parallel to the bottom of the second inclined hole 222 and a second force vertical to the bottom of the first inclined hole 221. Therefore, the composite 10 of this disclosure has a larger sliding friction than the conventional composite of vertical micropores, allowing an increased bonding strength.

FIG. 2 through FIG. 6 illustrate an exemplary method for manufacturing a composite 10 of metal and resin.

Figure 2:
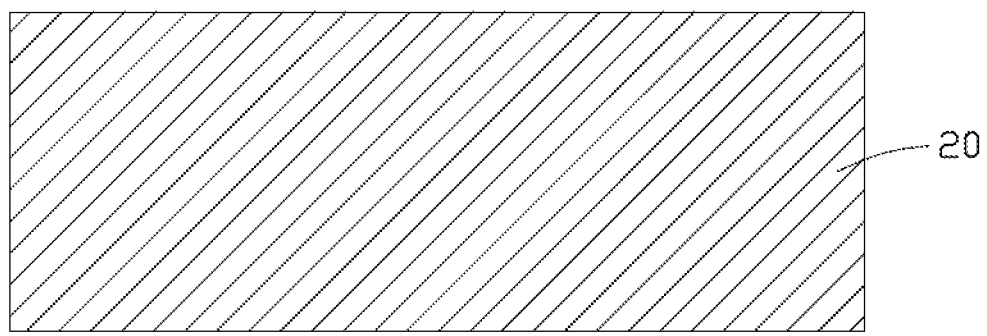
FIG. 2 illustrates a cross-sectional view of a portion of an exemplary composite of metal and resin processed in accordance with an initial step of an exemplary method of the present application.

FIG. 2 illustrates that a provided metal piece 20, after being shaped, can be cleaned with a degreasing agent solution. Any process, such as machining or casting, can form the metal piece 20.

The metal piece 20 can be immersed in the degreasing agent solution having a temperature in an approximate range from 20° C. to 30° C. for 1 to 6 minutes. The concentration of degreasing agent contained in the solution can be in an approximate range of 90 grams/liter (g/l) to 150 grams/liter (g/l). The metal piece 20 is washed with distilled water after being removed from the solution.

Figure 3:
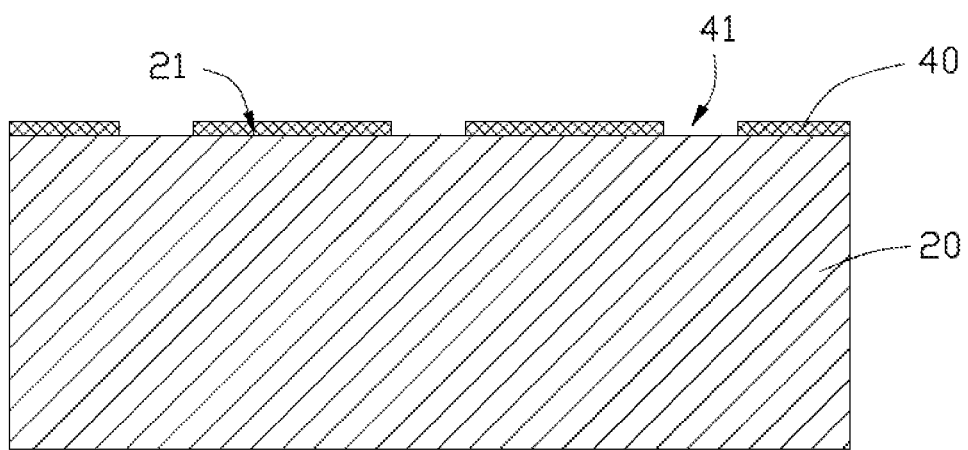
FIG. 3 illustrates a cross-sectional view of a portion of an exemplary composite of metal and resin processed in accordance with an intermediate step of an exemplary method of the present application.

FIG. 3 illustrates that a patterned photoresist layer 40 with a plurality of openings 41 can be formed on the surface 21 of the metal piece 20. In one exemplary embodiment, each of the openings 41 can be substantially circular and arranged in an array. In other exemplary embodiments, the openings 41 can be substantially square or other shapes. The openings 41 can be through holes or blind holes in the patterned photoresist layer 40. Each of the openings 41 may have a diameter in a range from about 100 nm to about 300 nm.

Figure 4:
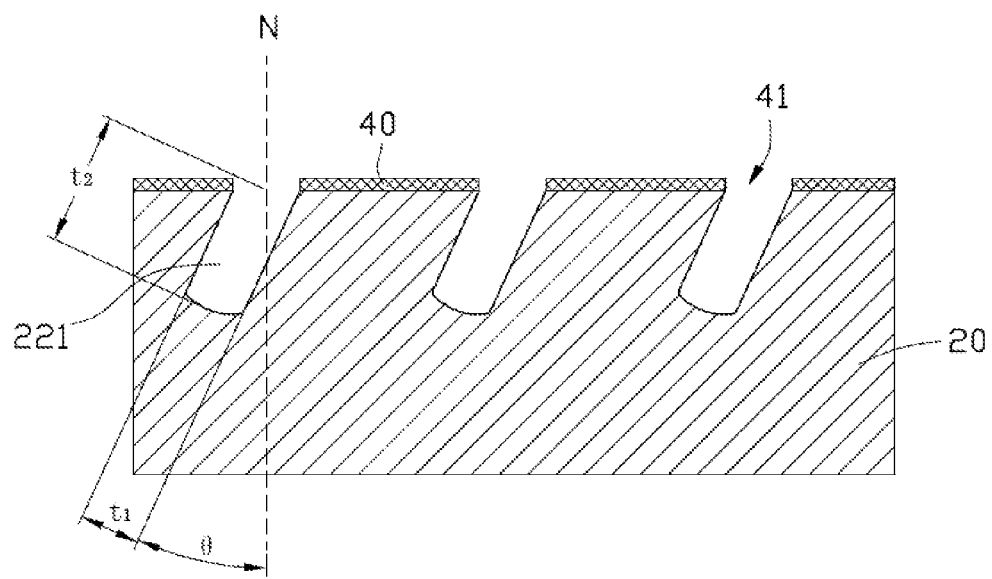
FIG. 4 illustrates a cross-sectional view of a portion of an exemplary composite of metal and resin processed in accordance with an intermediate step of an exemplary method of the present application.

FIG. 4 illustrates that a plurality of first inclined holes 221 can be formed on the surface 21 of the metal piece 20 by plasma etching, and the first inclined holes 221 can be arranged so as to be inclined toward the surface 21.

In detail, the first inclined holes 221 can be formed by a first plasma etching process with the patterned photoresist layer 40 as a mask. The first plasma etching process can be an isometric plasma etching process applied to the surface 21. The first inclined holes 221 extend through the corresponding openings 41 into the metal piece 20. The plasma can be argon gas or other gases. An etching direction of the plasma can be sloped at an angle tilted from the N-axis, and an etching angle can be in a range from about 5 degrees to 75 degrees.

In one exemplary embodiment, the first inclined hole 221 can be sloped at the angle θ with the N-axis, and the angle θ can be in a range from about 15 degrees to about 45 degrees. The diameter of first inclined hole 221 is t1, and the depth of the first inclined hole 221 is t2. In one exemplary embodiment, t1 can be in a range of about 100 nm to about 300 nm, and a width-to-depth ratio of the first inclined hole 221 can be in a range of about 1:3 to about 1:5.

Figure 5:
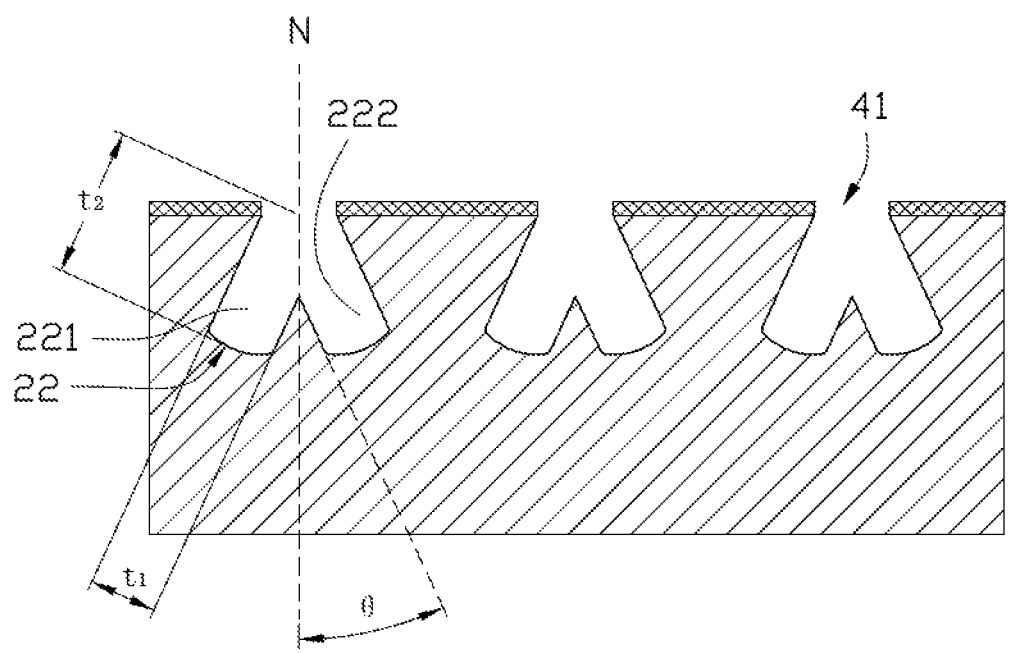
FIG. 5 illustrates a cross-sectional view of a portion of an exemplary composite of metal and resin processed in accordance with an intermediate step of an exemplary method of the present application.

FIG. 5 illustrates that a plurality of second inclined holes 222 can be formed on the surface 21 of the metal piece 20 by plasma etching, the first inclined hole 221 and the second inclined hole 222 to be disposed symmetrically around the N-axis, to form the micropore 22.

In detail, the second inclined holes 222 can be formed by a second plasma etching process with the patterned photoresist layer 40 as a mask. The second plasma etching process can be an isometric plasma etching process applied to the surface 21. The second inclined holes 222 extend through the corresponding openings 41 into the metal piece 20. The plasma can be argon gas or other gases. An etching direction of the plasma can be sloped at an angle tilted from the N axis, and an etching angle can be in a range from about 5 degrees to 75 degrees.

In one exemplary embodiment, the second inclined hole 222 can be sloped at the angle θ with the N axis, and the angle θ can be in a range from about 15 degrees to about 45 degrees. The diameter of second inclined hole 222 is t1, and the depth of the second inclined hole 222 is t2. In one exemplary embodiment, t1 can be in a range from about 100 nm to about 300 nm, and the width-to-depth ratio of the second inclined hole 222 can be in a range from about 1:3 to about 1:5. The second inclined hole 222 has a shape substantially similar to the shape of the first inclined hole 221.

Figure 6:
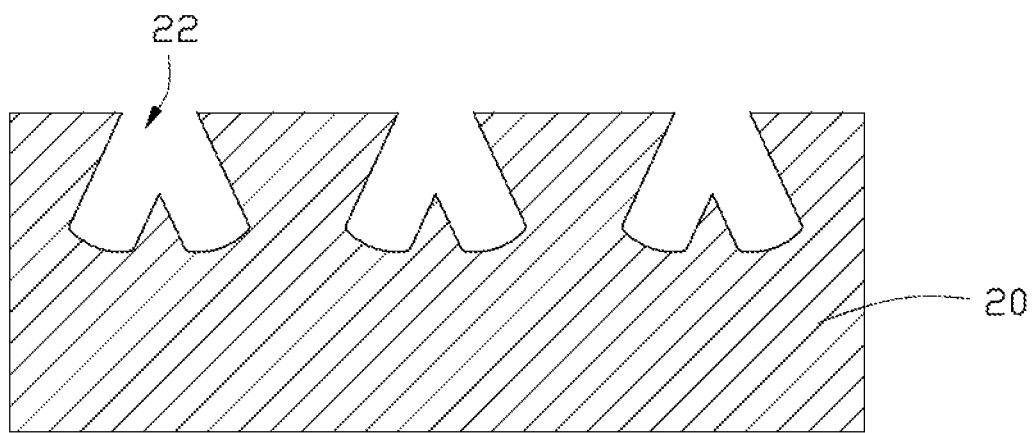
FIG. 6 illustrates a cross-sectional view of a portion of an exemplary composite of metal and resin processed in accordance with an intermediate step of an exemplary method of the present application.

FIG. 6 illustrates the patterned photoresist layer 40 being removed. The metal piece 20 can be inserted into a mold (not shown), and can be heated to a temperature in a range from 100° C. to 350° C. The heating can be accomplished using electromagnetic induction.

FIG. 1 illustrates the composite 10 of metal and resin. Molten resin material is injected into the mold and onto the metal piece 20. The resin material can be crystallizing-type thermoplastic resin. The molten resin material becomes embedded in the micropores 22 and bonds with the metal piece 20 when the resin material 30 is cooled. The crystallizing-type thermoplastic resin material can be selected from the group consisting of a composite of polyphenylene sulfide and glass fiber, polyamide, polyethylene terephthalate, or polybutylene terephthalate. When using the polyphenylene sulfide and glass fiber composite, the percentage composition of the glass fiber is in a range from 20 percent to 50 percent.

When the resin material 30 is embedded in the micropores 22 on the surface 21 of the metal piece 20, the combination strength between the resin and the metal is increased. The method of manufacturing such composite of metal and resin does not need strong acids or alkalis, so the method is more environmentally friendly than the conventional method. Furthermore, normal pressures can be used in the process, and the difficulty of processing is reduced, therefore, the method is more suitable for mass production.

It is believed that the present exemplary embodiments and their advantages will be understood from the foregoing description, and it will be apparent that various changes can be made thereto without departing from the spirit and scope of the exemplary embodiments or sacrificing all of its material advantages.

What is claimed is:

1. A composite of metal and resin, comprising:
    a metal piece comprising a surface, and
    a resin piece combined with the metal piece;
    wherein the surface of the metal piece comprises a plurality of micropores, and each of the plurality of micropores comprises a first inclined hole and a second inclined hole arranged inclined with the surface; the first inclined hole and the second inclined hole are arranged symmetrically around an axis perpendicular to the surface and communicate with each other through the surface; and portions of the resin piece is embedded in the plurality of micropores to combine with the metal piece.

2. The composite of metal and resin as claimed in claim 1, wherein diameters of the first inclined hole and the second inclined hole are in a range of about 100 nm to about 500 nm.

3. The composite of metal and resin as claimed in claim 1, wherein width-to-depth ratios of the first inclined hole and the second inclined hole are in a range of about 1:3 to about 1:5.

4. The composite of metal and resin as claimed in claim 1, wherein the first inclined hole and the second inclined hole are each sloped an angle with the axis perpendicular to the surface, and the angle is in a range from about 15 degrees to about 45 degrees.

5. The composite of metal and resin as claimed in claim 1, wherein the micropores are arranged in an array.

6. The composite of metal and resin as claimed in claim 1, wherein at least one of the plurality of micropores is in the shape of an inverted "V".

7. The composite of metal and resin as claimed in claim 1, wherein the material of the metal piece is selected from a group consisting of aluminum alloy, magnesium alloy, stainless steel alloy, copper, and copper alloy.

8. The composite of metal and resin as claimed in claim 1, wherein the resin material is crystallized-type thermoplastic resin.

9. The composite of metal and resin as claimed in claim 8, wherein the crystallized-type thermoplastic resin is selected from a group consisting of a composite of polyphenylene sulfide and glass fiber, polyamide, polyethylene terephthalate, and polybutylene terephthalate.

10. The composite of metal and resin as claimed in claim 9, wherein a percentage composition of the glass fiber is in a range from 20 percent to 50 percent in the composite of polyphenylene sulfide and glass fiber.

* * * * *